(12) United States Patent
Glen (10) Patent No.: US 7,307,644 B2
(45) Date of Patent: Dec. 11, 2007

(54) METHOD AND SYSTEM FOR EFFICIENT INTERFACING TO FRAME SEQUENTIAL DISPLAY DEVICES

(75) Inventor: David I. J. Glen, Toronto (CA)

(73) Assignee: ATI Technologies, Inc., Ontario (CA)

( * ) Notice: Subject to any disclaimer, the term of this patent is extended or adjusted under 35 U.S.C. 154(b) by 907 days.

(21) Appl. No.: 10/170,335

(22) Filed: Jun. 12, 2002

(65) Prior Publication Data

US 2003/0231191 A1    Dec. 18, 2003

(51) Int. Cl.
    *G09G 5/02*  (2006.01)
(52) U.S. Cl. ................... 345/690; 345/589; 345/593
(58) Field of Classification Search ........ 348/441–459; 345/589–605, 718, 455, 456, 549, 690, 597, 345/22, 55–100; 382/167; 358/539
See application file for complete search history.

(56) References Cited

U.S. PATENT DOCUMENTS

| | | | | |
|---|---|---|---|---|
| 3,598,904 A | * | 8/1971 | Foerster | 348/455 |
| 5,442,379 A | * | 8/1995 | Bruce et al. | 345/600 |
| 5,479,534 A | * | 12/1995 | Tanaka et al. | 382/167 |
| 5,774,178 A | * | 6/1998 | Chern et al. | 348/206 |
| 5,798,753 A | * | 8/1998 | Zhou et al. | 345/549 |
| 5,801,665 A | * | 9/1998 | Zhaog et al. | 345/600 |
| 5,903,366 A | * | 5/1999 | Hirabayashi et al. | 358/539 |
| 5,929,843 A | * | 7/1999 | Tanioka | 345/600 |
| 6,198,469 B1 | * | 3/2001 | Tjandrasuwita | 345/690 |
| 6,549,240 B1 | * | 4/2003 | Reitmeier | 348/459 |
| 6,559,859 B1 | * | 5/2003 | Henry et al. | 345/690 |
| 6,724,934 B1 | * | 4/2004 | Lee et al. | 382/167 |
| 6,771,233 B1 | * | 8/2004 | Kim | 345/32 |

* cited by examiner

*Primary Examiner*—David L. Lewis (57) ABSTRACT

A method and a system for frame data to a frame sequential display device without using a frame buffer at the display device and while still maintaining the ability to use a standard interface capable of running at standard bandwidths is disclosed herein. A display system may be used to convert a multiple color frame to a plurality of single color component frames for sequential display on a display device. The display system includes a data system, a display controller, and a display device. The data system provides graphics data to the display controller. The display controller converts the graphics data into single color component frames and then transmits the single color component frames sequentially in sets of parallel data to the display device for display. The display device receives the sets of parallel data and converts the parallel data into sequential data. The sequential data is then output to a frame sequential display. In at least one embodiment, the display controller and the display device are connected using a standard interface transmitting data at a standard rate.

19 Claims, 6 Drawing Sheets

METHOD AND SYSTEM FOR EFFICIENT INTERFACING TO FRAME SEQUENTIAL DISPLAY DEVICES

FIELD OF THE INVENTION

The present invention relates generally to video display systems and more particularly to frame sequential display of video images.

BACKGROUND OF THE INVENTION

Many known display devices, such as televisions and liquid crystal display panels display individual color components of a video frame in parallel. Accordingly, the interface between the display device and the display controller must send all of the color components in parallel. Other known display devices, such as head mounted micro displays, display each color component of a video frame sequentially. It is recognized in the display electronics industry that sequential display of multiple color video frames may reduce the number of pixels needed in a display and/or simplify the color projection optics of the display device. As a result, however, the refresh rate of the display device must be significantly increased to prevent color break up artifacts. For example, if every video frame sent in parallel to the display device has three color components, the refresh rate of the display device must be three times the incoming frame rate from the display controller in order to have an equivalent refresh rate, however, color break-up may still occur depending on the effective refresh rate.

It is known to use a frame buffer located on the display interface for the display device to perform a parallel to sequential color conversion. However, the use of a frame buffer adds cost and size to the display device. It is also known to implement a display controller that transmits the video frame data at the single color component frame sequential rate instead of the parallel multiple color frame display rate using a standard parallel color interface with the receiver using only one of the parallel color channels of each frame. However, the complexity and the cost of the interface electronics increase since the standard parallel color interface must run at a bandwidth significantly greater than standard speeds.

Therefore, a method and/or system that overcome these problems would be useful.

BRIEF DESCRIPTION OF THE DRAWINGS

Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE FIGURES

In accordance with at least one embodiment of the present invention, a first set of parallel data associated with a first set of pixels is received at a display device from a plurality of inputs at a first frequency. The display device displays the first set of pixels in a serial format at a second frequency greater than the first. Additionally, a second set of parallel data associated with a second set of pixels is received at the display device from the plurality of inputs at the first frequency. The display device immediately displays the second set of pixels in a serial format at the second frequency. One advantage of the present invention is that the size and complexity of the display device is reduced since a frame buffer is not required to store frame data. Another advantage of the present invention is that standard display interfaces may be used at standard bandwidths.

FIGS. 1-6 illustrate a display system in accordance with a specific embodiment of the present invention having a data system, a display controller, and a display device, as well as a method for its use. As described in greater detail below, the display system converts an image frame having multiple color components into a plurality of single color component display frames. The display controller transmits the single color component display frames sequentially in sets of parallel data to the display device for display. The display device receives the sets of parallel data and converts the parallel data into sequential data. The sequential data is then output to a frame sequential display. In at least one embodiment, the display controller and the display device are connected using a standard interface transmitting data at a standard rate.

Figure 1:
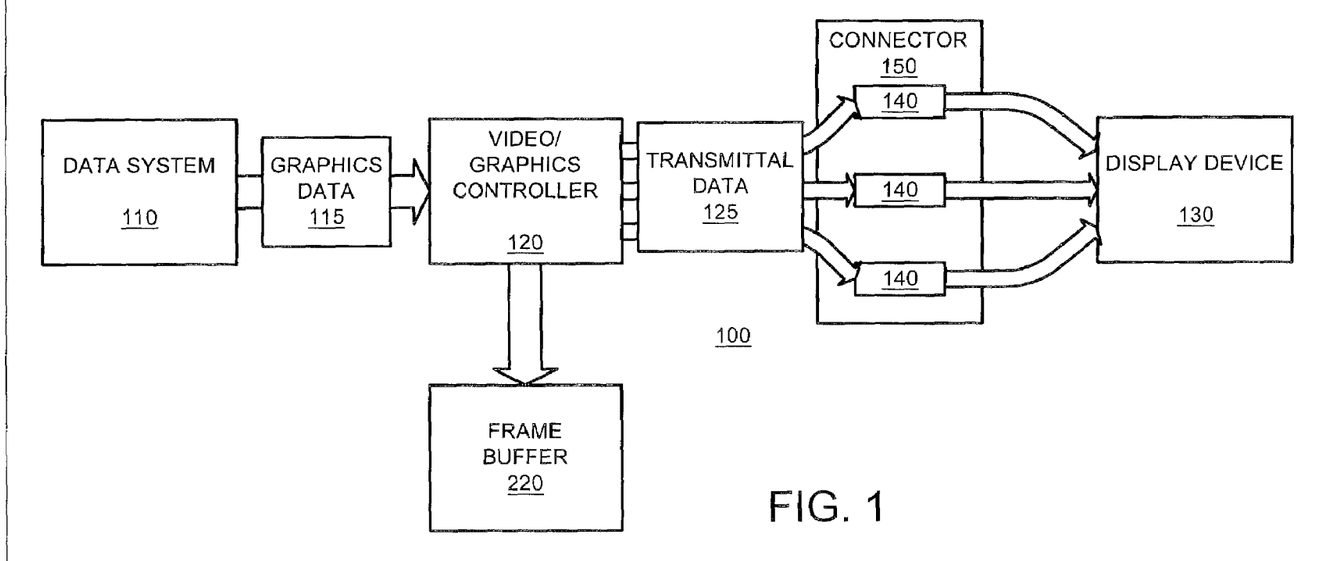
FIG. 1 is a diagram illustrating a display system according to at least one embodiment of the present invention.

Referring now to FIG. 1, a display system is illustrated according to at least one embodiment of the present invention. Display system 100 includes data system 110, video/graphics controller 120, connector 150, and display device 130. Data system 110 is capable of providing video/graphics data 115 to video/graphics controller 120 for processing. Data system 110 can include any device capable of rendering graphics data, such as a desktop computer rendering a graphical user interface to display on a computer monitor, a videocassette recorder (VCR), a digital versatile disc (DVD) player, a movie projector, a virtual reality headset, and the like.

In at least one embodiment, data 115 includes data representative of one or more image frames, or portions of one or more image frames, composed of a plurality of picture elements (pixels). Each pixel includes one or more color components. In at least one embodiment of the present invention, graphics data 115 is composed of pixel data for red, green, and blue (RGB) color components. For example, graphics data 115 could represent one or more bit-mapped image frames In this case, graphics data 115 includes a plurality of data elements, with each data element associated with a single pixel. For example, if graphics data 115 included a bit-mapped image frame with up to 16,777,216 colors, each pixel in the bit-mapped frame could be associated with a 24 bit datum. Each 24-bit datum includes an eight-bit value for each of the red, green, and blue components of the associated pixel. Unless noted otherwise, references made herein to the display of a frame of data also applies to a portion of a frame of data. It will be appreciated that other combinations of color components may be used with out departing from the spirit or the scope of the present invention. For example, graphics data 115 could be composed of pixel data for cyan, magenta, yellow and black (CMYK) color components.

After video/graphics controller 120 has retrieved or received graphics data 115, video/graphics controller 120 processes and/or renders graphics data 115 which is stored in frame buffer 220. The data stored in frame buffer is later accessed and provided as transmitted data 125 for output to display device 130. In at least one embodiment, video/graphics controller 120 extracts a display frame, or a portion thereof, from display buffer 220 for one color component from a sequence of multiple color image frames and outputs the single color image frame (transmitted data 125) for the selected color component in parallel over connector 150, which includes a plurality of data ports 140. For example, video/graphics controller 120 processes graphics data 115 to extract serial display frames for the red, green, and blue color components. In this example, video/graphics controller 120 extracts the red color component for the pixels of an entire image frame or a portion of the image frame and then outputs the red component display frame (transmitted data 125) in parallel over three data ports 140 of connector 150 traditionally associated with one of a red, green, and blue color channels. For example, after the red component display frame is transmitted, video/graphics controller 120 then transmits the green component display frame in parallel for a portion of an image frame or an entire image frame, and then the blue component display frame is transmitted in parallel. Note that the term "image frame", as used herein, refers to a video frame having a plurality of color components, while the term "display frame" refers to a frame representing a single color component of an image frame. For example, a RGB image frame can have a red display frame, a green display frame, and a blue display frame. Different color component transfer methods are discussed in greater detail herein with reference to FIG. 5.

Display device 130 receives transmitted data 125 in parallel from video/graphics controller 120 over a plurality of data ports 140. Display device 130 converts the parallel transmitted data 125 and converts it to a serial format for display on a frame sequential display device, such as a digital light projector (DLP), digital micromirror display, or video display glasses. In at least one embodiment, display device 130 displays an entire display frame or a portion of an entire display frame of graphics associated with one color component at a time. For example, display device 130 could sequentially display a first display frame containing the red color component of an image frame, a second display frame containing the green color component of the image frame, and a third display frame containing the blue color component of the image frame. However, in order to prevent color break-up artifacts, the sequential color refresh rate of display device 130 must be at a higher frequency than the rate at which a display system that displays all color components simultaneously. For example, if a desired effective image frame display rate of 60 frames per second is desired, and three different single color component display frames are shown quickly in sequence to affect the appearance of the display a multiple color image frame, display device 130 must be capable of displaying individual color component display frames at a rate of at least 180 frames per second (60 display frames per second ×3 color component frames/image frame) to assure an equivalent refresh rate. A higher rate may be needed to avoid color break-up.

For clarity, the terms "serial" and "parallel" as used herein with reference to the conversion and transmission of display data will be described in greater detail. As previously discussed, in at least one embodiment, the information associated with each single color component display frame of a multiple color image frame is transmitted sequentially from video/graphics controller 120 to display device 130. While the color component information is extracted from pixel values associated with the image frame in sequence (or in serial), the color component information is transmitted in parallel simultaneously, or nearly simultaneously. For example, assume an image frame (consisting of red, green, and blue color components) has been processed by video/graphics controller 120 and is stored in frame buffer 220, and connector 150 includes three data ports 140. Conventionally, video/graphics controller 120 would extract the color component information for all three colors in each pixel from the image frame data, and transmit the three color component values in parallel over the three data ports 140, one data port 140 for each color component. For example, the values representative of the red, blue, and green color components of a pixel value would each be sent simultaneously (or nearly simultaneously) over a data port 140 corresponding to one of the color components. Alternatively, in at least one embodiment of the present invention, rather than extracting all three color component values for a single pixel and then transmitting the single pixel's values over three data ports 140 in parallel, video/graphics controller 120 extracts a single color component value for three pixels of the image frame and transmits the single color component value for the three pixels over three data ports 140 simultaneously (or near simultaneously). In other words, the single color component values for the three pixels are extracted and are then transmitted simultaneously (in parallel).

Similarly, in one embodiment, display device 130 receives display data in parallel from video/graphics controller 120. Conventionally, each data port 140 transmits a value associated with one color component of a plurality of color components for a single pixel at a time. For example, red, green, and blue color values for a pixel are received simultaneously (or near simultaneously) by display device 130 over three data ports 140. Each data port 140 is associated with one of the color components. Display device 130 then uses the values to display the pixel with the associated color components. Alternatively, in one embodiment of the present invention, each data port 140 transmits a value associated with a single color component for a plurality of pixels. For example, the green component values of three pixels are transmitted in parallel to display device 130 over three data ports 140. Display device 130 then displays each of the three pixel component values. In summary, the single color component values for the three pixels are received in parallel, but are displayed serially.

Figure 2:
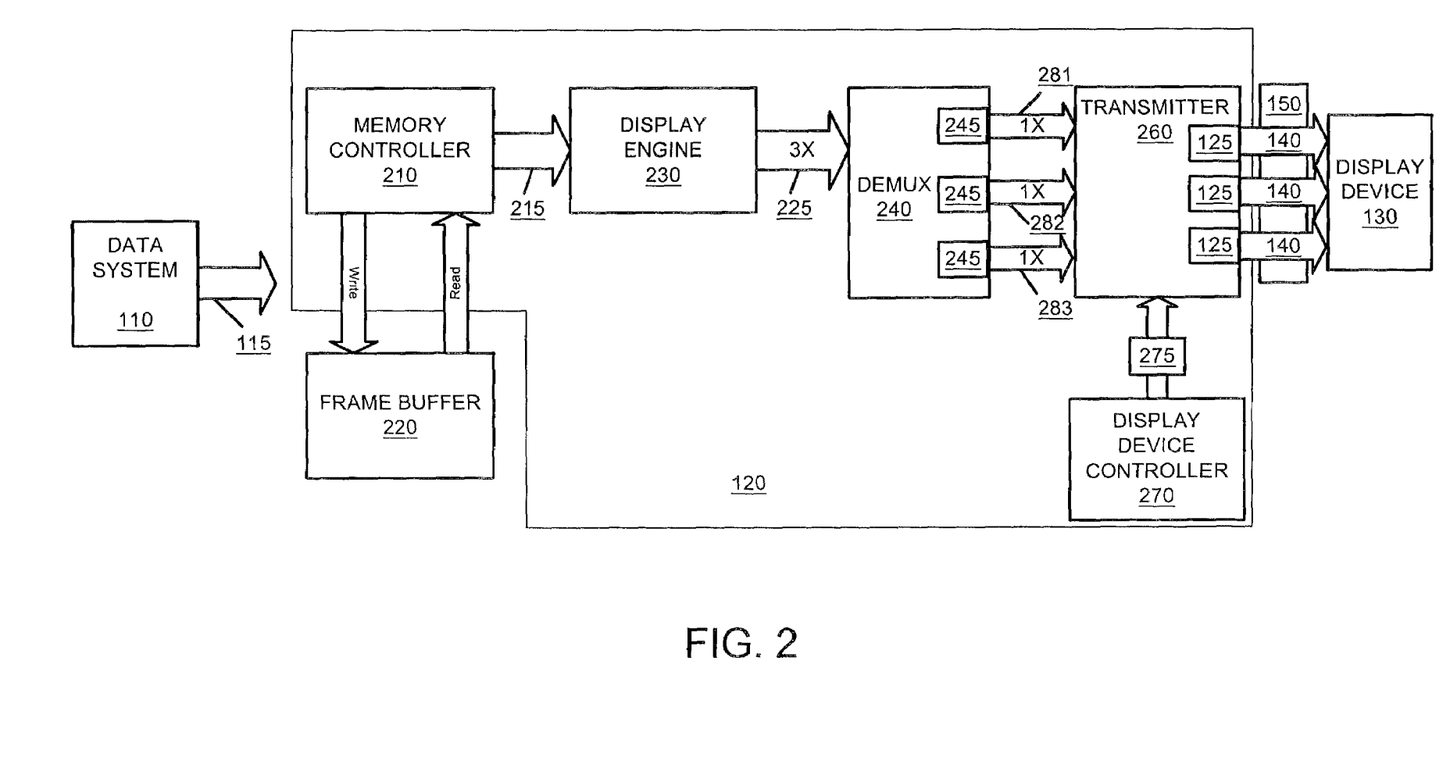
FIG. 2 is a diagram illustrating a system including a video/graphics controller according to at least one embodiment of the present invention.

Referring to FIG. 2, video/graphics controller 120 is illustrated in greater detail according to at least one embodiment of the present invention. Video/graphics controller 120 includes memory controller 210, display engine 230, frame sequential demultiplexor 240, transmitter 260, and display device controller 270. Frame buffer 220 is illustrated as external memory that is coupled to the memory controller 210, and in an alternate embodiment can be integrated onto controller 120 It will be appreciated that one or more elements of video/graphics controller 120 may be physically or logically located on data system 110. For example, frame buffer 220 can be implemented in video/graphics controller 120 and/or data system 110. It will also be appreciated that one or more elements illustrated in FIG. 2 may be implemented using software, firmware, or a combination therein.

As discussed previously, in one embodiment, video/graphics controller 120 retrieves or receives and stores graphics data 115 (FIG. 1) from data system 110. Graphics data 115 may be transmitted over a serial connection, a parallel connection, a bus, a wireless connection, the Internet, and the like. For example, data system 110 could be implemented as a DVD player installed on a personal computer (not shown). The DVD player (data system 110) transmits graphics data 115 to video/graphics controller 120 of the personal computer via a bus, such as a peripheral connect interconnect (PCI) bus, or an advanced graphics port (AGP). In at least one embodiment, graphics data 115 is stored in frame buffer 220 once obtained from data system 110.

The storage of data to be displayed in frame buffer 220 is controlled by memory controller 210, as is the retrieval of transmitted data 215 from memory 220. In at least one embodiment, memory controller 210 retrieves all or a portion of display data 215 from the frame buffer 220 and provides the display data 215 to the to display engine 230 for further processing. If additional data stored in the frame buffer 220 is to be processed, memory controller 210 repeats this process until all of the stored image frame data is displayed. In at least one embodiment, memory controller 210 is controlled by another system. For example, a central processing unit (CPU) of a personal computer could control memory controller 210. The CPU (not shown) could instruct memory controller 210 as to which locations are to be read from or written to in memory 220. Display engine 230, in at least one embodiment, renders display data 215 to generate rendered data 225, which is then provided to DEMUX 240.

In at least one embodiment, DEMUX 240 selects one color component of a plurality of color components for pixels values of rendered data 225 and outputs data associated with a plurality of pixels with a selected single color component (color component data 245) to a plurality of channels 281-283. Each channel (channels 281-283) is capable of transmitting at least one pixel color component to transmitter 260. In one implementation of the present invention, rendered data 225 includes RGB color component data and there are three channels 281-283, each channel conventionally corresponding to one of a red (channel 281), green (channel 282), and blue color channel (channel 283). In this implementation, DEMUX 240 selects one of the red, green, or blue color components and extracts the first three sequential pixel values of the chosen color component and transmits these values (color component data 245) over channels 281-283. For example, DEMUX 240 could select the red color component of rendered data 225 and transmit, in parallel, the first, second, and third red pixel values (color component data 245) over the red, blue, and green channel (channels 281-283), respectively. Since only one color component is selected at a time for output from DEMUX 240, DEMUX 240 ignores the data associated with the remaining color components.

Since the remaining color component information is not used by DEMUX 240, rendered data 225 must be supplied to DEMUX 240 at a rate greater than the effective refresh rate of display device 130. The effective refresh rate, as used herein, refers to the refresh rate of non-frame sequential color display device. For example, a flat panel (a non-frame sequential color display device) displays the red, green, and blue color component of each pixel of an image frame simultaneously. As a result, each image frame has all the color information as it is displayed. Since many flat panel systems display 60 full color image frames per second, the effective refresh rate is 60 frames per second. Similarly, the sequential color refresh rate, as used herein, refers to the refresh rate of a frame sequential color display device needed to simulate an effective refresh rate. For example, if a red, green, and blue display frame are shown in sequence to affect a full color image frame, the three color component display frames need to be displayed in sequence in the same amount of time needed to display a full color image frame at a given effective refresh rate. For example, if the effective refresh rate of display system 130 is 60 image frames per second, 60 display frames of each red, green, and blue color component must be shown in one second, resulting in an sequential color refresh rate of 180 display frames per second (60 display frames/color*3 colors/image frame). In at least one embodiment, the sequential refresh rate that rendered data 225 is supplied is approximately N times the effective refresh rate of display device 130, where N is the number of channels 281-283 used by DEMUX 240. For example, if display device 130 displays RGB frame data, DEMUX 240 would use three channels 281-283 corresponding to a red, green, and blue channel at the effective refresh rate. If display device 130 has an effective refresh rate of 120 image frames per second, rendered data 225 is supplied to DEMUX 240 at a rate equivalent to 360 display frames per second (3 display frames per 1 RGB image frame). In one embodiment of the present invention, DEMUX 240 is a logical demultiplexor. DEMUX 240 can also be provided through switching circuitry and the like.

In at least one embodiment, transmitter 260 receives color component data 245 in parallel from DEMUX 240 and then formats and/or encodes color component data 245 into transmitted data 125 for transmission to display device 130. Transmitter 260 can format or encode color component data 245 by adding error correction data, changing data word size, compressing color component data 245, and the like. Alternately, additional encoding or formatting of color component data 245 may be unnecessary, in which case transmitter 260 could simply transmit color component data 245 (as transmitted data 125) to display device 130. In one embodiment, display device 130 is capable of receiving non-video data from video/graphics controller 120 that modifies and/or configures the functioning of display device 130. For example, video/graphics controller 120 could send and/or receive configuration data over an $I^2C$ compliant display data channel (DDC) line. Display device controller 270 provides the configuration data (control data 275) to transmitter 260 for output to display device 130. Control data 275 can include, but is not limited to, display effective refresh rate, or sequential refresh rate, contrast settings, brightness settings, synchronization information, display mode selection, and the like. Display device controller 270, in one embodiment, uses extended display identification data (EDID) retrieved from a VESA EDID-compliant display device 130 to determine the composition of control data 275. The EDID format includes information such as maximum image size, color characteristics, factory pre-set timings, frequency range limits, and the serial number. In one embodiment, the EDID information may also include synchronization information and/or display mode information. It will be appreciated that other suitable communication protocols and corresponding hardware may be used according to the objectives of the present invention.

Transmitter 260 provides transmitted data 125 in parallel, after any necessary formatting, to display device 130 over a plurality of data ports of connector 150. More specifically, the plurality of data ports are the set of RGB color channels associated with connector 150 traditionally used for providing color RGB color component data in parallel. However, in accordance with the disclosure herein the two or more of the set of RGB color channels are used to transmit a plurality of common color components in parallel. Transmitted data 125 may be transmitted in a digital form, or transmitted data 125 may be converted to an analog form for transmission. For example, if display device 130 includes a video graphics array (VGA) compliant interface, transmitter 260 could include one or more digital-to-analog converters (DAC) and connector 150 could include a VGA connector. In this case, transmitted data 125 can be converted from a digital to an analog format and transmitted over the VGA connector (connector 150) using the three color channels (data ports 140), each conventionally associated with one of a red, green, and blue channel. Alternately, display device 130 could include a DVI-compliant interface, transmitter 260 could include a digital video interface (DVI) transmitter, and connector 150 could include a DVI connector. Similar to the analog case, transmitted data 125, specific to a single color component, is digitally transmitted in parallel over the DVI connector (connector 150) using the three digital color channels (data ports 140) of the DVI connector conventionally associated with the digital red, green, and blue channels. Various methods of data transmission between video/graphics controller 120 and display device 130 are discussed in greater detail herein with reference to FIGS. 5 and 6.

In one embodiment, video/graphics controller 120 is capable of switching between display modes, such as a conventional mode, where the color components of a single pixel are transmitted in parallel, or a frame sequential color mode, where a single color component for multiple pixels are transmitted in parallel. It will be appreciated that a number of methods may be used to select and/or set the display mode. For example, a value could be written to a control register indicating a conventional mode or frame sequential color mode. Alternatively, the mode could be set by an electronic or mechanical switch. The switch could be accessible to user, allowing the user to select the mode. In at least one embodiment, the display mode must be coordinated with display device 130.

Figure 3:
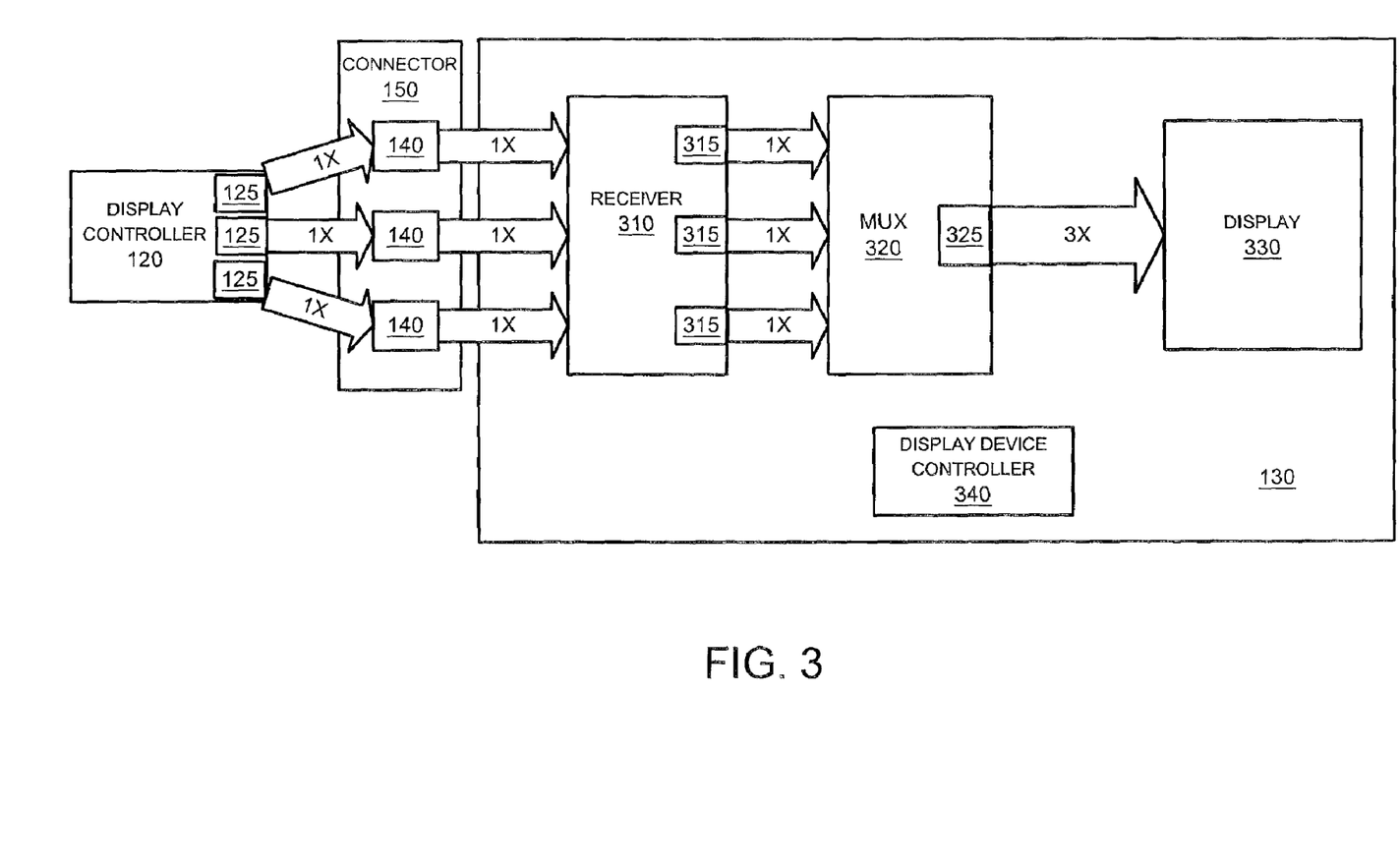
FIG. 3 is a diagram illustrating system including a display device according to at least one embodiment of the present invention.

Referring next to FIG. 3, display device 130 is illustrated in greater detail according to one embodiment of the present invention. Display device 130 includes receiver 310, frame sequential multiplexor 320, herein referred to as MUX 320, display 330, and display device controller 340. It will also be appreciated that one or more elements illustrated in FIG. 3 may be implemented using software, firmware, or a combination therein.

Receiver 310 receives, processes, and/or conditions transmitted data 125 sent over connector 150 from video/graphics controller 120 for internal use. In at least one embodiment, transmitted data 125 is transmitted in parallel over a plurality of data ports 140 located on connector 150. As discussed previously with reference to FIG. 2, transmitted data 125 can be transmitted in a digital or analog form. If transmitted data 125 is transmitted in an analog form, receiver 310, in one embodiment, converts transmitted data 125 from the analog form to a digital form before outputting the converted display data (parallel display data 315) to MUX 320. For example, receiver 310 could include one or more analog-to-digital converters (ADC) used to convert the analog signals received over data ports 140 to digital form. In another embodiment, transmitted data 125, sent in an analog form, is output in parallel in an analog form as parallel display data 315 to MUX 320 in its original analog form. Likewise, received digital data can be transmitted by the receiver 310 in digital format, or converted and transmitted in an analog format. Note that, in at least one embodiment, a frame buffer is not implemented by display device 130, unlike many common frame sequential display systems.

As discussed previously, transmitted data 125 can include formatting and/or control information, such as error correction data or control data 275 (FIG. 2). In at least one embodiment, receiver 310 is capable of retrieving any format or control information from transmitted data 125 and reformatting transmitted data 125 into parallel display data 315, if needed. For example, transmitted data 125 could include one or more error correction bits. Receiver 310 could receive transmitted data 125, correct any errors using an error detection and correction algorithm and then reformat transmitted data 125 into parallel display data 315 by stripping the error correction bits from transmitted data 125. Similarly, receiver 310, in one embodiment, is capable of decompressing transmitted data 125 and outputting the decompressed data as parallel display data 315. In the event that transmitted data 125 includes control data 275, in at least one embodiment, receiver 310 is capable of retrieving control data 275 from transmitted data 125. In one embodiment, display device controller 340 uses this control data to configure one or more elements of display device 130. For example, if the retrieved control data 275 includes sequential refresh rate configuration information, display device controller 340 is capable of writing the sequential refresh rate configuration information to a configuration register associated with display 330 for implementation. It will be appreciated that other data processing, formatting, and/or encoding methods may be used without departing from the spirit or scope of the present invention.

In at least one embodiment, MUX 320 receives parallel display data 315 from receiver 310 in a parallel format and outputs this frame data in a serial format (as serial display data 325) to display 330. Since parallel display data 315 is received in parallel but output serially as serial display data 325, serial display data 325 is output at a rate greater than the rate at which a parallel set of parallel display data 315 is received. For example, if parallel display data 315 is transmitted in parallel in sets of three single color component pixel values at a time, MUX 320 outputs the three pixel component color values of sequential display data 325 in sequence in the same amount of time. For example, if three red component values for three pixels are received in parallel from receiver 310, each red component value is output sequentially by MUX 320 and is displayed as a RGB pixel component in sequence on display 330. In another embodiment, a plurality of color component values for a single pixel are transmitted in parallel to MUX 320. MUX 320 then outputs the plurality of color component values as a single combined value for display as a single pixel on display 330. For example, if a red, green, and blue value are sent in parallel as eight bit values to MUX 320, MUX 320 combines the three 8 bit values into a 24 bit value and sends this value to display 330. Display 330 would then extract the values for each of the red, green, and blue component of the single pixel and display the color components of the single pixel.

Display 330 receives serial display data 325 from MUX 320 and displays the display frame or frames represented by serial display data 325. Display 330 can include display devices capable of displaying single color display frames and/or multiple color image frames, or a portion thereof, sequentially. Examples of frame sequential color display devices include head-mounted micro displays, digital micromirror device (DMD) based projection displays such as digital light projectors (DLP), and the like.

Figure 4:
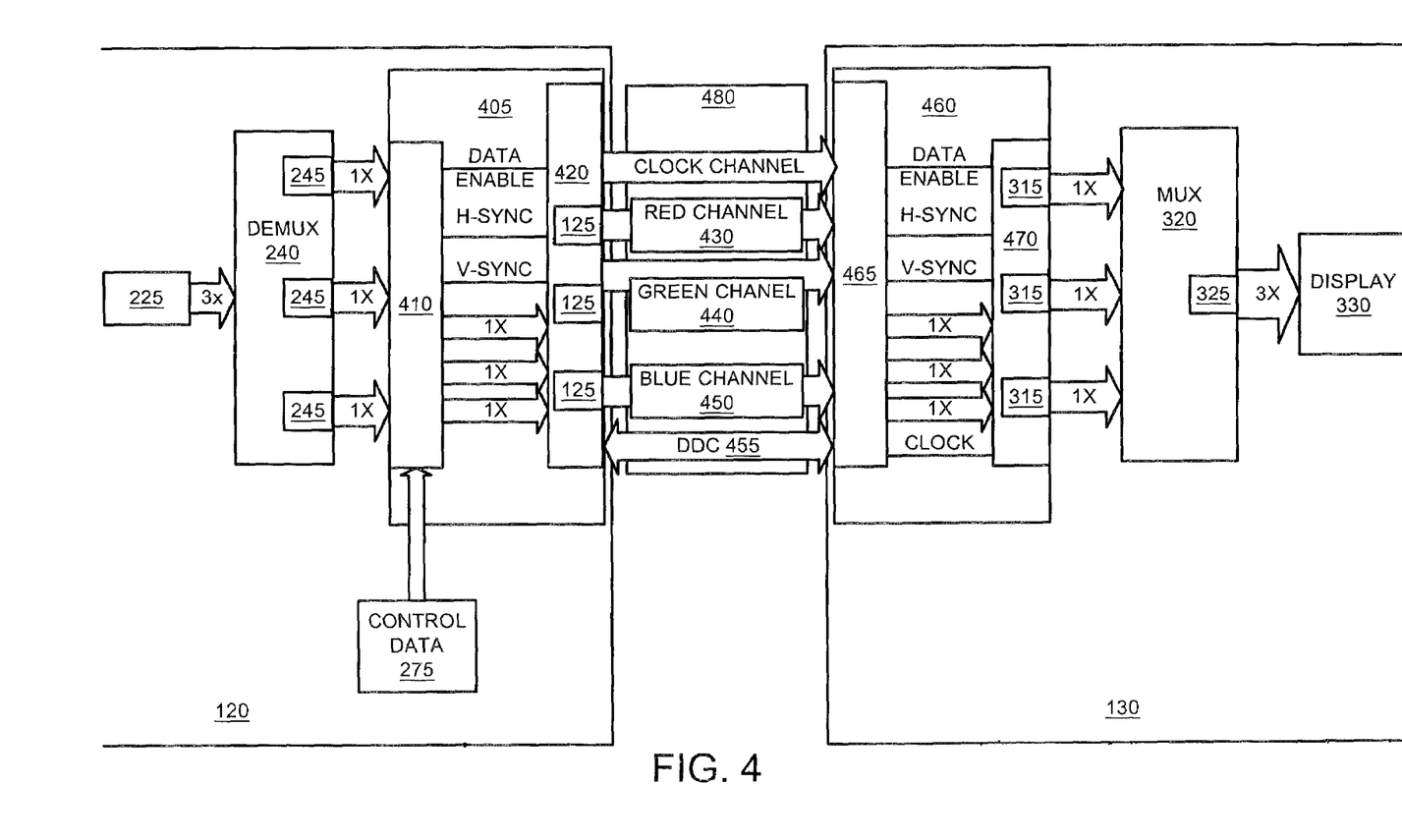
FIG. 4 is a diagram illustrating a system for transmitting graphics data in a digital format according to at least one embodiment of the present invention.

Referring next to FIG. 4, a specific implementation for digital transmission of graphics data is illustrated according to one embodiment of the present invention. As discussed previously, transmitted data 125 may be transferred between video/graphics controller 120 and display device 130, depending on their capabilities, in a digital format. In at least one embodiment, a DVI-compliant display controller (video/graphics controller 120) includes DVI digital transmitter 405 (transmitter 260, FIG. 2), and DVI-compliant display device (display device 130) includes DVI digital receiver 460 (receiver 310, FIG. 3). DVI digital transmitter and DVI digital receiver 460 may implement only a digital format, such as a transmission minimized differential signal (TMDS) format or low voltage differential signal (LVDS) format, or may implement a combination of an analog format, such as a video graphics array (VGA) format.

There are generally two types of DVI: the DVI-D, able to transmit only digital display data; and the DVI-I, able to transmit both digital display data and analog display signals. Most modern analog interface and digital interface displays have connector pins for a display data channel (DDC). The DDC (DDC 455) is used to transmit data about the identification and properties of a display to a graphics controller, or for the graphics controller to send configuration commands to the display. Examples of commands video/graphics controller 120 might send to display device 130 include commands to adjust a display's brightness and/or contrast.

In one embodiment, transmitting DVI digital transmitter 405 includes input interface 410 and DVI output interface 420. Input interface 410 receives color component data 245 from DEMUX 240 as previously discussed. In one embodiment, a DVI protocol allows a multiple color image frame to be composed of three color components, red, green, and blue. DEMUX 240 selects one color component of the three color components and transmits three pixel values for the selected color component in parallel to input interface 410. DEMUX 240 continues to transmit three pixel values for the selected color component from incoming rendered data 225 until DEMUX 240 is instructed to select a different color component to output. As a result, DEMUX 240 is capable of outputting a portion of a color component display frame, or the entire color component display frame. For example, DEMUX 240 could be instructed to output an entire display frame of the red component, then an entire display frame of the green component, then an entire display frame of the blue component, and then cycle back to the red component. In this case, DEMUX 240 would transmit three pixels of a color component display frame until the display frame was entirely sent, and then start transmitting the next color component display frame three pixels at a time. Color component display modes are discussed in greater detail with reference to FIG. 5.

Input interface 410 transmits color component data 245 to DVI output interface 420. In at least one embodiment, input interface 410 also provides DVI output interface 420 with a data enable signal indicating when display device 130 should read video information, a horizontal sync signal indicating when display device 130 should retrace horizontally, and a vertical sync signal indicating when display device 130 should retrace vertically. DVI output interface 420 encodes color component data 245 into transmitted data 125 and transmits transmitted data 125 to display device 130 using connection 480 which includes DVI connectors and an interface cable. Connection 480 includes clock channel (DVI-I, LVDS), and three data channels: red channel 430, green channel 440, and blue channel 450 (data ports 140), conventionally associated with the primary colors red, green, and blue. Although each of the three channels are used to transmit the three primary color components of a multiple color image frame simultaneously in conventional display devices, in at least one embodiment, video/graphics controller 120 uses red channel 430, green channel 440, and blue channel 450 to transmit three pixel values in parallel for a single color component. For example, if video/graphics controller 120 is currently transmitting the red color component of a fill-color image frame, a first pixel value of a set of three red pixel values is transmitted over red channel 430, a second pixel value of the set of three red pixel values is transmitted over green channel 440, and the remaining red pixel value is transmitted over blue channel 450.

DVI digital receiver 460 receives transmitted data 125 from DVI digital transmitter 405 and outputs parallel display data 315 using DVI input interface 465 and output interface 470. DVI input interface 465 is coupled to DVI output interface 420 via connection 480. DVI input interface 465 receives transmitted data 125 in parallel via red channel 430, green channel 440, and blue channel 450. This data is decoded, if necessary, and transmitted to output interface 470 as parallel display data 315. In one embodiment, parallel display data 315 includes control data 275 and/or control signals, such as data enable, horizontal sync, vertical sync, or a clock signal. Output interface 470 transmits parallel display data 315 in parallel to MUX 320, where the data is then serialized and transmitted as serial display data 325 to display 330, as discussed previously in greater detail.

In one embodiment, a transmission-minimized differential signaling (TMDS) link is used for sending information between video/graphics controller 120 and display device 130. A TMDS transmitter (DVI digital transmitter 405) implements advanced encoding algorithms to convert each eight bits of data from a single data stream of color component data 245 to a 10 bit transmission minimized, DC balanced character (transmitted data 125). A TMDS receiver (DVI digital receiver 460) can perform similar decoding algorithms to recreate the transmitted data streams. In another embodiment, an analog connection is used to send information between video/graphics controller 120 and display device 130. In this case, transmitter 260 may include one or more digital-to-analog converters capable of converting the plurality of digital data streams into analog signals. Similarly, receiver 310 may include one or more analog-to-digital converters capable of converting the analog data streams into digital form. It will be appreciated that other digital or analog transmission methods, such as LVDS may be used, Since video/graphics controller 120 sends a single color component data over a plurality of data ports 140 conventionally associated with specific color components, video/graphics controller 120 and display device 130, in one embodiment, must be able to synchronize to determine which color component of a plurality of color components is being transmitted at a given point. In one embodiment, synchronization of video/graphics controller 120 and display device 130 is accomplished by synchronizing DEMUX 240 with MUX 320. In one implementation, a display data channel (DDC 455) is used by video/graphics controller 120 to transmit synchronization information to display device 130. One method is for video/graphics controller 120 to send a signal over DDC 455 to indicate to MUX 320 where DEMUX 240 is in the a pattern or sequence. Conversely, display device 130 could send a signal over DDC 455 to indicate to DEMUX 240 where MUX 320 is in a pattern or sequence. For example, video/graphics controller 120 could send a pattern data indicating that a 640 by 480 pixel dimension frame of the red component is to be displayed first, then a frame of the same size of the green component, then a same sized frame of the blue component, then the pattern cycles back to a frame of the red component, and so on. The pattern data is sent over DDC 455 to display device 130, which implements the pattern in the controller of MUX 320. In this case, MUX 320 determines that the first 307200 pixel values (640×480) are red pixel values, the next 307200 pixel values are green pixel values, and so on.

Another method to synchronize DEMUX 240 and MUX 320 is to send a pulse on one of channels 430-450 during active hsync and/or vsync to indicate which color component the following data belongs to until the next pulse is sent indicating the next color component. Alternatively, an initial color component state could be set (such as the red color component) and DEMUX 240 and MUX 320 could switch between color components at each active vsync using a set sequence. Likewise, when using digital DVI interfaces, spare TMDS control bits can be used to indicate the color component of the following data. For example, a value of 1 during the active vsync could indicate that MUX 320 is to reset the color sequence and then proceed with a set color sequence, such as R,G,B,R,G,B, and switch to the next color sequence during the next active vsync.

The TDMS protocol allows control signals to be sent when data enable is held at the low logic level, such as during a horizontal or vertical retrace. Since two control lines of the six available control lines are used, data control can be transmitted over the four unused data lines for use as control signals during this portion of the frame sequence. In implementations where a TDMS transmitter and a TDMS receiver are used to transmit display data between video/graphics controller 120 and display device 130, the control signal states can be used to synchronize DEMUX 240 and MUX 320. In one implementation, one or more of the for control signal states corresponds to a color component. Each time the data enable is set low for a retrace, the TDMS transmitter could propagate a control signal state for a specific color component to the TDMS receiver. When the display system finished the retrace, MUX 320 would assume that the following pixel values are pixel values for the color component associated with the control signal state. For example, if a control value state 01 associated with the red component is asserted by the TMDS transmitter during a vertical retrace, MUX 320 would process all following pixel values as red pixel values until the next control signal state is asserted. Alternately, each control signal state could be associated with a predetermined pattern or sequence stored on video/graphics controller 120 and display device 130. Note that in some systems, one or more control signal states are reserved for other functions; therefore fewer than four states may be available. It will be appreciated that other methods of synchronizing DEMUX 240 and MUX 320 may be used.

Figure 5:
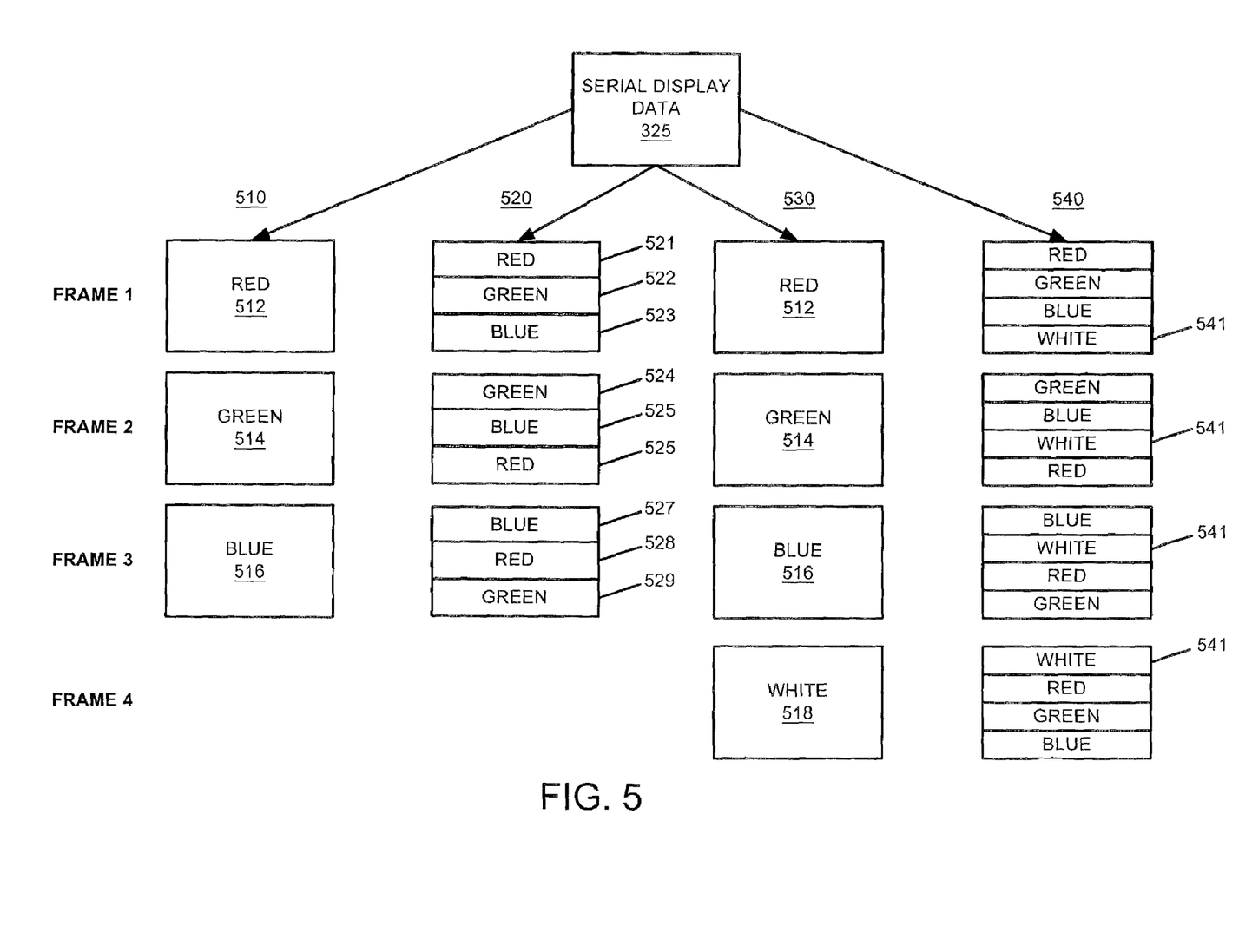
FIG. 5 is a diagram illustrating various display modes according to at least one embodiment of the present invention.

Referring now to FIG. 5, various color component display sequences are illustrated according to at least one embodiment of the present invention. RGB frame sequence 510 includes red display frame 512, green display frame 514, and blue display frame 516. RGB frame portion sequence 520 includes red frame portion 521, green frame portion 522, and blue frame portion 523. RGBW frame sequence 530 includes red display frame 512, green display frame 514, blue display frame 516 and white display frame 518. RGBW frame portion sequence 540 includes a plurality of red frame portions, green frame portions, blue frame portions, and white frame portions 541.

Many display devices display all of the color components of a multiple color image frame in parallel. As discussed previously, frame sequential display devices differ since they display all or a portion of a display frame of each color component of an image frame sequentially. For example, many frame sequential display devices utilize the red-green-blue (RGB) color component format. These display devices display a display frame containing the red component of an image frame, then a display frame containing the green component, then a display frame containing the blue component. The cycle is repeated for the number of frames displayed. If the display frames are displayed at a fast enough rate, the average human eye perceives the display of three different color component display frames as one image frame containing all three colors simultaneously. To minimize visual artifacts, such as screen flicker and color break-up, the three color component display frames must be displayed in sequence in the same time a multiple color image frame would normally be displayed. For many applications, the minimum rate at which humans are unlikely to detect visual artifacts is 60 or more image frames per second. In order to prevent visual artifacts in these applications, frame sequential display devices must display each color component of a three color component system at 180 display frames per second.

A common display sequence that includes the display cycle of an entire red component display frame, then a green component display frame, and then a blue component display frame is illustrated by RGB frame sequence 510. Video/graphics controller 120 (FIG. 1) first transmits a pixel value data set (serial display data 325) representative of an entire red component frame (red display frame 512) of an image frame. As discussed previously, digital display interfaces, such as DVI interfaces, and analog interfaces, such as VGA, often have a three separate channels, each channel conventionally used to transmit the red, green, and blue color components in parallel. In one embodiment, the pixel values of red display frame 512 are transmitted in parallel in sets of three over the three color channels. For example, the first pixel value of red display frame 512 is transmitted on the red channel, the second pixel value of red display frame 512 is transmitted on the green channel, and the third pixel value is transmitted on the blue channel. The three channels are used to send the three pixel values in parallel, and then the next three pixel values are sent in the same manner, and so on until all pixel values of red display frame 512 have been transmitted. After red display frame 512 has been displayed, green display frame 514 is transmitted in the same manner and displayed, then blue display frame 516. The cycle of red display frame 512, green display frame 514, then blue display frame 516 is repeated for each image frame received or retrieved from data system 110 (FIG. 1).

Another display sequence involving the display cycle of red, green, and blue color components is illustrated by RGB frame portion sequence 520. Rather than transmit and display the entire color component frames in sequence, RGB frame portion sequence 520 transmits and displays a different portion of each color component display frame (serial display data 525) sequentially. In one embodiment, a first cycle of RGB frame portion sequence 520 includes transmitting in parallel the pixel values, in sets of three, of a first red portion 521 over three RGB color channels. The next three pixel values of the first red portion 521 are then sent in the same manner, and so on until all pixel values of first red frame portion 521 have been transmitted. Next first green frame portion 522 is sent in the same manner, then first blue frame portion 523 is sent and displayed. For a second cycle, second green portion 524, different from first green portion 522 is sent and displayed in the discussed manner. Next, second blue frame portion 525, different from fist blue frame portion 523 is sent and displayed. Then second red portion 526, different from first red frame portion 521 is sent and displayed. For a third cycle, a third blue portion 527, different from first blue portion 523 and second blue portion 525 is sent and displayed. Next, a third red portion 528, different from first red portion 521 and second red portion 526, is sent and displayed. Finally, a third green portion 529, different from first green portion 522 and second green portion 524, is sent and displayed. The first, second, and third data cycles are repeated for each multiple color image frame received or retrieved from data system 110 (FIG. 1). In effect, RGB frame portion sequence 520 displays a different portion of each color component in each frame displayed.

In some cases, the display of red, green, and blue color components sequentially may cause a perceived reduction in brightness by viewers. One method of reducing this perception is to display a white display frame after all other display frames for a multiple color image frame are displayed.

A RGB display sequence including a white display frame is illustrated by RGBW frame sequence 530. Similar to RGB frame sequence 520, red display frame 512, green display frame 514, and blue display frame 516 are displayed sequentially in one cycle. RGBW frame sequence 530 additionally includes the display of a white display frame of data (white display frame 518) as the last frame displayed in the display cycle. In many display devices, white pixels are displayed by giving driving a white display element to produce an amount of white light representative of red, green, and blue elements of each pixel the same value.

In one embodiment, display device 130 displays white display frame 518 according to a predetermined pattern or sequence. In another embodiment, the value of a white pixel of white display frame 518 is dependent on the lowest value of the red, green, and blue color component of the pixel in the image frame. For example, assume the red component for a given pixel had a value of 200, the green component had a value of 100, and the blue component had a value of 120. The value of the white value of the pixel during display of white display frame 518 is dependent on the lowest value, which is the green component value of 100. Consequently, the white pixel will have a value of 100 when displayed. This results in white display frame 518 having pixels with varying shades. Alternatively, video/graphics controller 120 could cease color component output while display device 130 displayed white display frame 518, in a process similar to blanking. It will be appreciated that different methods for determining the amount of white to be displayed can be used, and the different sequences for red, blue, green, and white color component display frame displays may be used. For example, white display frame 518 could be displayed before blue display frame 516 and after green display frame 514. It will also be appreciated that since four display frames are displayed per multiple color image frame cycle rather than three display frames, the video/graphics controller 120 and display device 130 must display color component display frames at a faster rate than if only three color component display frames were used. RGBW frame portion sequence 540 is similar to RGB frame sequence 520 in that different portions of each red, green, and blue color components are displayed in sequence. However, white portion 541 is also displayed in varying sequence. Because there are four color components (red, green, blue, and white), four cycles are required to display all color component display frames for a multiple color image frame as opposed to three for just three color components. As with RGBW frame sequence 530, the display rate of display device 130 and video/graphics controller 120 may need to be increased to prevent visual artifacts.

Figure 6:
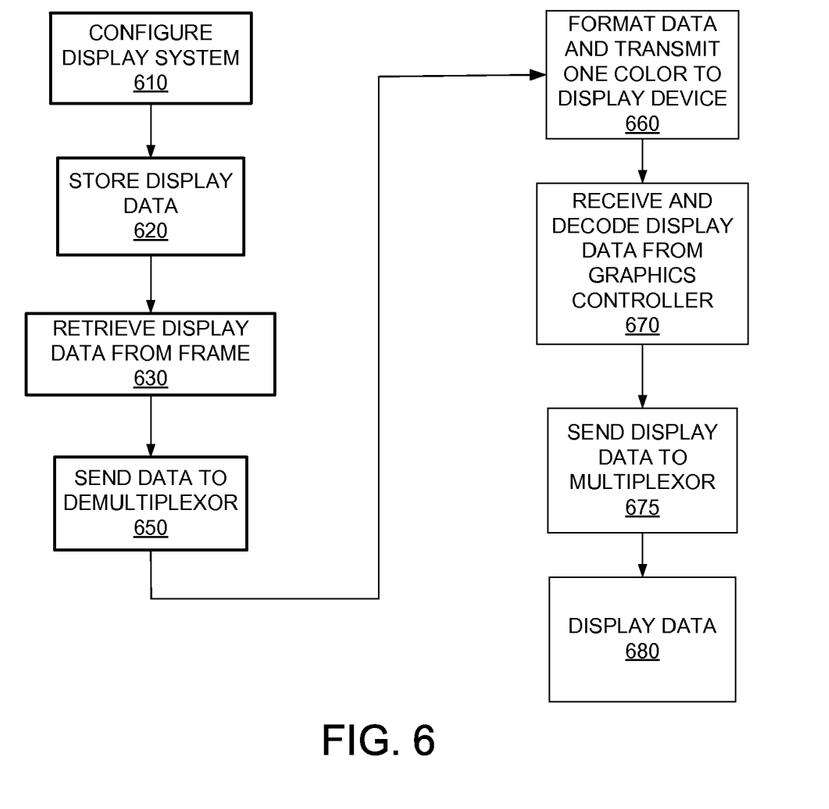
FIG. 6 is a flow diagram illustrating a method for sequential display of display frames according to at least one embodiment of the present invention.

Referring next to FIG. 6, a method for processing and transmitting display data associated with a frame is illustrated according to one embodiment of the present invention. Reference numerals in FIG. 6 that are common to reference numerals in FIGS. 1-5 indicate like, similar or identical features or elements. The method commences at step 610 where display device 130 is configured by video/graphics controller 120 (FIG. 1). In one embodiment, video/graphics controller 120 retrieves EDID information, such as maximum displayable image size, color characteristics, factory pre-set timings, and frequency ranges, from display device 130 over a DDC. Video/graphics controller 120 then uses the EDID information to configure display device 130. In one embodiment, the configuration process further includes selecting one of a plurality of display modes, such as a RGB mode, a frame sequential mode and the like, and configuring display device 130 for the selected mode. For example, a computer monitor (display device 130) may be capable of switching between a RGB mode, with all colors displayed in parallel, or a frame sequential mode based on a value of a control register located on the color monitor. In this case, video/graphics controller 120 could send control data 275 (FIG. 2) to the computer monitor to indicate in which mode the computer monitor should operate. In at least one embodiment, the display mode information is selected and configured using EDID data or control data sent over a DDC. As discussed previously, part of the frame sequential display mode configuration process may include synchronizing DEMUX 240 (FIG. 2) and MUX 320 (FIG. 3) for transmission and reception of parallel pixel value data. Generally, the configuration step 610 is performed only during system start-up.

Next, in step 620, video/graphics controller 120 retrieves or receives display data 115 from data system 110 (FIG. 1) and stores graphics data 115 in frame buffer 220 (FIG. 2). Alternatively, in one embodiment, graphics data 115 may be stored in memory or a storage device common to both video/graphics controller 120 and data system 110. For example, motion picture expert's group (MPEG) data from a DVD player residing in a personal computer could be decoded and stored in decoded format on a hard disk. Video/graphics controller 120, also on the personal computer, may access the decoded MPEG data on the hard disk as needed.

In step 630, graphics data 115 representing an image frame or video frame is retrieved from storage. Graphics data 115 may be retrieved, in one embodiment, directly from frame buffer 220 by memory controller 210 (FIG. 2). For example, memory 220 could be a frame buffer capable of holding one or more multiple color image frames. Memory controller 210 retrieves a portion or all of an image frame and outputs the data to display engine 230 (FIG. 2) using a bus or other data transfer mechanism. Alternatively, using the previous example, memory controller 210 could direct the hard drive to move one or more portions or all of one or more multiple color image frames to memory 220, and memory controller 210 may then access graphics data 115 from memory 220 and output the data to display engine 230.

In step 650, DEMUX 240 selects a first one of the plurality of color components for output to transmitter 260 (FIG. 2). DEMUX 240, in one embodiment, selects a first color component of a multiple color image frame and outputs the pixel values in parallel for all of the selected color component data from the frame to transmitter 260. DEMUX 240 then selects a different color component for sequential output and transmits the selected color component pixel values in parallel, and so on until the last color component of a multiple color image frame is selected and output to transmitter 260. It will be appreciated that the various steps described with reference to FIG. 6 can occur in a pipelined fashion to accommodate each of the color components.

In another embodiment, portions of the color components of a frame are output sequentially, as discussed with reference to FIG. 5. In at least one embodiment, DEMUX 240 and DEMUX 360 (FIG. 3) must be synchronized so that DEMUX 360 can determine which color component it is receiving from video/graphics controller 120. As previously discussed, various methods may be used for synchronization, such as the use of a digital data channel to transmit or reference desired patterns or sequences.

In step 660, the color component data is formatted and/or encoded as needed by transmitter 260 (FIG. 2) and then transmitted to display device 130 (FIG. 1) for display. The color component data is received in series by transmitter 260 at a first frequency and is transmitted in parallel to receiver 310 (FIG. 3) at second frequency less than the first. Data formatting and/or encoding can include the addition of error detection bits and control data, data compression, and the like, Once the color component data (transmitted data 125) is encoded, it may be transmitted in parallel to display device 130 using a number of transmission methods. In one embodiment, the transmitter 260 may be a DVI transmitter. The DVI transmitter takes three parallel pixel values of a single color component provided by DEMUX 240 and transmits the three pixel values (and additional control data) in parallel over three data ports conventionally associated with a red, green, and blue channel. In at least one embodiment, the DVI transmitter transmits transmitted data 125 on each data port at a typical DVI connector bandwidth, but since three data ports are used in parallel, the effective transmission rate is three times greater. Alternately, transmitter 260, in one embodiment, converts transmitted data 125 from a digital format to an analog format for transmission to display device 130. The flow from step 660 proceeds in parallel to both steps 670 and 685.

In step 670, display device 130 receives the color component data from video/graphics controller 120. Receiver 310 (FIG. 3) receives the transmitted data 125 in parallel of a plurality of data ports 140 (FIG. 1). Receiver 310 decodes transmitted data 125 and outputs the data to DEMUX 360. Methods for decoding transmitted data 125 by receiver 310 can include data decompression, error checking and correction, conversion from an analog format to a digital format, etc. In one embodiment, received data 315 (FIG. 3) is transmitted in parallel to MUX 320 using the same number of parallel channels as between receiver 310 and transmitter 260.

In step 675, received data 315 is input in parallel to DEMUX 360 (FIG. 3) at a first frequency and serially output to display 330 (FIG. 3) at another frequency greater than the first. For example, if the display frames displayed on display 330 include a red, green, and blue component and the interface between display device 130 and video/graphics controller 120 has three data ports, received data 315 is transmitted by three pixel values at a time in parallel. In this case, DEMUX 360 takes the three pixel values in parallel at an incoming frequency and outputs the three pixel values sequentially at a frequency three times greater than the incoming frequency.

In step 680, the pixel values are sent in series to display 330, which in turn uses the pixel values to display a display frame representing a single color component of a multiple color image frame. Portions or entire frames of each color component are shown sequentially at a frame display rate fast enough to give the illusion that all the color components of a multiple color frame are being displayed simultaneously. In at least one embodiment, DEMUX 360 must synchronize with DEMUX 240 (FIG. 2) to determine which color component is represented by received data 315. Various methods of synchronization are discussed in greater detail with reference to FIG. 4.

In the preceding detailed description of the preferred embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
   determining a first color component for a first pixel at a first rate;
   determining a first color component for a second pixel at the first rate; and
   providing, at a second rate, the first color component for the first pixel and the first color component for the second pixel in parallel during a first time for output to a display device, the first rate faster than the second rate.

2. The method as in claim 1, wherein determining the first color component for the second pixel occurs subsequent to determining the first color component for the first pixel.

3. The method as in claim 1, further comprising:
   determining a second color component for the first pixel substantially simultaneously with determining the first color component for the first pixel.

4. The method as in claim 3, further comprising:
   determining a second color component for the second pixel substantially simultaneously with determining the first color component for the second pixel.

5. The method as in claim 1, further comprising providing synchronization data, wherein the synchronization data includes a common clock for the first color component of the first and second pixels.

6. The method as in claim 1, wherein the first rate is at least twice as fast as the second rate.

7. The method as in claim 1, wherein determining the first color components of the first and second pixels and providing the first color components of the first and second pixels are associated with a first mode of operation.

8. The method as in claim 7, wherein the first mode of operation includes:
determining a common color component for the first and second pixels; and
providing the common color component for the first and second pixels in parallel for output.

9. The method as in claim 7, further comprising a second mode of operation including:
determining the first color component for the first pixel at the first rate;
determining a second color component for the first pixel at the first rate; and
providing the first color component and the second color component for the first pixel in parallel for output.

10. The method as in claim 1, further comprising:
determining a second color component for the first pixel at the first rate;
determining a second color component for the second pixel at the first rate; and
providing the second color components for the first and second pixels in parallel for output at the second rate.

11. The method as in claim 1, wherein providing the second color components occurs subsequent to providing the first color components.

12. The method as in claim 1, wherein the first color component is a white color component.

13. A graphics controller including:
a graphics engine having an output to provide a plurality of pixel sets at a first rate, where each pixel set includes a plurality of color components; and
a demultiplexor having an input coupled to the output of the graphics engine and a plurality of outputs to provide in parallel at a second rate a common color component data for the plurality of pixel sets, the first rate faster than the second rate.

14. The graphics controller as in claim 13, further including:
a transmitter having an input coupled to the output of said demultiplexor and an output to provide at least a portion of the common color component data in parallel.

15. The graphics controller as in claim 13, wherein the graphics engine is to receive and process graphics commands.

16. The graphics controller as in claim 13, wherein the common color component data is representative of a white color component of the plurality of pixels.

17. A graphics controller comprising:
a graphics engine having an output to provide a plurality of pixel sets at a first rate, each pixel set including at least a red component data, a green component data and a blue component data; and
a demultiplexor having an input coupled to the output of the graphics engine and a plurality of outputs, the demultiplexor operable to:
provide at least a portion of the red component data of a first plurality of pixel sets in parallel at a second rate via the plurality of outputs at a first time, the first rate faster than the second rate;
provide at least a portion of the green component data of the first plurality of pixel sets in parallel at a second rate via the plurality of outputs at a second time, the first rate faster than the second rate;
provide at least a portion of the blue component data of the first plurality of pixel sets in parallel at a second rate via the plurality of outputs at a third time, the first rate faster than the second rate; and
providing a white color component data in parallel at a second rate via the plurality of outputs at a fourth time, the first rate faster than the second rate.

18. The graphics controller as in claim 17, wherein the fourth time is subsequent to the first, second and third times.

19. The graphics controller as in claim 17, wherein each plurality of pixel sets represents a corresponding image frame and where:
the red component data represents a red display frame of the image frame;
the green component data represents a green display frame of the image frame;
the blue component data represents a blue display frame of the image frame; and
the white component data represents a white display frame.

* * * * *